(12) United States Patent
Park et al.

(10) Patent No.: US 9,623,504 B2
(45) Date of Patent: Apr. 18, 2017

(54) SYSTEM AND METHOD FOR BRAZING (75) Inventors: Junyoung Park, Greer, SC (US); Jason Robert Parolini, Greer, SC (US)

(73) Assignee: General Electric Company, Schenectady, NY (US)

(*) Notice: Subject to any disclaimer, the term of this patent is extended or adjusted under 35 U.S.C. 154(b) by 861 days.

(21) Appl. No.: 12/941,946

(22) Filed: Nov. 8, 2010

(65) Prior Publication Data

US 2012/0111928 A1    May 10, 2012

(51) Int. Cl.
| | | |
|---|---|---|
| B23K 1/00 | (2006.01) | |
| B23K 1/19 | (2006.01) | |
| B23K 35/02 | (2006.01) | |
| B23K 35/36 | (2006.01) | |
| B23K 101/00 | (2006.01) | |

(52) U.S. Cl.
CPC ............ *B23K 1/0018* (2013.01); *B23K 1/19* (2013.01); *B23K 35/02* (2013.01); *B23K 35/0244* (2013.01); *B23K 35/36* (2013.01); *B23K 2201/001* (2013.01); *F05B 2230/237* (2013.01); *F05B 2230/80* (2013.01); *Y10T 428/12222* (2015.01)

(58) Field of Classification Search
CPC .................................................. B23K 1/0018
USPC ......................................................... 228/245
See application file for complete search history.

(56) References Cited

U.S. PATENT DOCUMENTS

| | | | |
|---|---|---|---|
| 798,332 A | 8/1905 | Green et al. | |
| 2,968,405 A * | 1/1961 | Veres | 210/496 |
| 3,006,757 A | 10/1961 | Hoppin, III et al. | |
| 3,442,010 A | 5/1969 | Albers | |
| 3,516,825 A | 6/1970 | Shashkov et al. | |
| 3,589,952 A | 6/1971 | Burne | |
| 5,935,718 A | 8/1999 | Demo et al. | |
| 6,163,959 A | 12/2000 | Arraitz et al. | |
| 6,222,151 B1 * | 4/2001 | Ziolkowski et al. | 219/86.1 |
| 6,470,568 B2 | 10/2002 | Fried et al. | |
| 7,199,174 B2 | 4/2007 | Ellison et al. | |
| 7,303,112 B2 | 12/2007 | Ivory et al. | |
| 2004/0178251 A1 * | 9/2004 | Trucco | 228/248.1 |
| 2008/0237306 A1 * | 10/2008 | Sathian | 228/119 |
| 2010/0187290 A1 * | 7/2010 | Holi | 228/119 |

FOREIGN PATENT DOCUMENTS

| | | |
|---|---|---|
| EP | 1623787 A1 | 2/2006 |
| JP | 2009148785 A | 7/2009 |
| WO | WO 2009051031 A1 * | 4/2009 |

OTHER PUBLICATIONS

American Welding Society (AWS) C3 Committee on Brazing and Soldering; "Brazing Handbook", Chapter 12, Fifth Edition, International Standard Book No. 978-0-87171-046-8, 2007, 27 pages.

(Continued)

*Primary Examiner* — Nicholas P D'Aniello
(74) *Attorney, Agent, or Firm* — Fletcher Yoder, P.C.

(57) ABSTRACT

Systems and methods are provided for improved brazing. A system includes a gap filling compound (GFC). The GFC includes a brazing alloy. The system also includes a GFC retention screen. The GFC retention screen configured to be disposed over the GFC to retain the GFC within the gap during brazing. The GFC retention screen is also configured to enable gas to escape from the GFC during brazing.

13 Claims, 5 Drawing Sheets

(56) References Cited

OTHER PUBLICATIONS

Kay, W. Daniel; "Repair Brazing", Practical Welding Today, May-Jun. 2000, 4 pages.
Peaslee, Robert L. et al.; "Brazing Handbook", Fifth Edition, 2007, 740 pgs.
European Search Report Mailed Feb. 17, 2015.

* cited by examiner

SYSTEM AND METHOD FOR BRAZING

BACKGROUND OF THE INVENTION

This invention relates to the brazing of materials and, more specifically, to the wide gap brazing or repair of mechanical components.

Turbomachinery components, such as turbine casings, blades or buckets and vanes, are subjected to high temperatures and stresses during operation. Under such conditions, the components may become physically worn, resulting in the formation of cracks, voids and worn surfaces. Welding, brazing, or gap brazing may be used to restore the components to more optimal operating conditions. However, it may be difficult to braze some wide gaps.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gap filling compound (GFC). The GFC includes a brazing alloy. The GFC is configured to be disposed inside a gap of a substrate. The system also includes a GFC retention screen. The GFC retention screen configured to be disposed over the GFC to retain the GFC within the gap during brazing. The GFC retention screen is also configured to enable gas to escape from the GFC during brazing.

In a second embodiment, a method includes applying a GFC having a filler metal inside a gap of a substrate. The method also includes disposing a screen on top of the gap and the substrate. Additionally, the method includes applying a heat to melt the filler metal in the gap while the screen retains the GFC in the gap and allows gas to escape.

In a third embodiment, a repair kit includes a GFC having a plurality of particles. The repair kit also includes a screen having a plurality of openings sized smaller than the particles. The screen is disposed on the GFC to block the particles but to allow gas flow during brazing.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

In certain applications, turbomachinery (e.g., turbines, compressors, and pumps) and other machinery may include components that are exposed to heavy wear conditions. For example, certain turbine system components such as blades, casings, rotor wheels, shafts, nozzles, and so forth, may operate in high heat and high revolution environments. A cavity or gap may develop on a metallic substrate of the components, requiring repair. Some of these gaps may be considered wide gaps due to size of the gap or crack. For example, some gaps may include a gap having a width or length of approximately 3 mm or more. In the repair or joining of metallic substrates using a gap filling compound (GFC), defects within worn articles are first removed by mechanical means, such as by grinding, or the surfaces of the joint are brought into position with one another. The GFC is then placed within the repair cavity of the gap or between the joint surfaces. During the brazing process, the article is held at a temperature at which the GFC melts, re-solidifies and fuses with the parent metal of the article forming a sound, high strength joint or repair.

In certain cases, the GFC may include filler material such as ground metal, metal beads, and/or wires. Gaseous and/or thermal activity occurring during the brazing operation may result in the filler material and other components rising or "bubbling" out of the cavity. The outgassing effect may result in defects, such as voids, cavities, tears, and the like. Accordingly, the resulting repair or joint may not be as strong, because not all of the material is suitably disposed inside the gap. The embodiments disclosed herein enable a more secure brazing or sintering by containing substantially all of the GFC's constituents inside of the gap or joint. Accordingly, the brazed area may be made stronger, more durable, and may have a longer working life.

In certain embodiments, a mesh or perforated sheet metal is disposed on top of the GFC. Such a mesh or perforated sheet metal includes a material composition suitable for withstanding the heat generated during brazing without melting or exhibiting substantial deformation in geometry. Additionally, the mesh or perforated sheet metal includes openings large enough for passage of the gases resulting from brazing or sintering activity, but small enough to contain a substantial portion of non-gaseous brazing composition, including any filler material. Further, the mesh or perforated sheet metal includes flexible properties that allow for the placement of the mesh or sheet over curved and other non-planar surfaces. That is, the mesh or perforated sheet metal may be bent by applying a moderate force, for example, by hand, and thereafter keep its shape. Indeed, the mesh or perforated sheet metal may be bent to follow the contour of certain surfaces, such as the inside curved walls of a casing or shroud.

In other embodiments, a substrate, such as a ceramic having a porosity suitable for passage of the brazing gases, may be used. In these embodiments, the substrate may enable the use of a higher brazing temperature, and thus, the GFC composition may include metals and/or metal alloys having higher melting temperatures. Any number of suitable GFC compositions may be used, and any number of metals, metal alloys, and metalized ceramics may be brazed or joined with the embodiments disclosed herein, including inconel, steel, stainless steel, chromoly steel, nickel, cobalt, cast iron, iron, aluminum, manganese, tungsten, and/or titanium.

Figure 1:
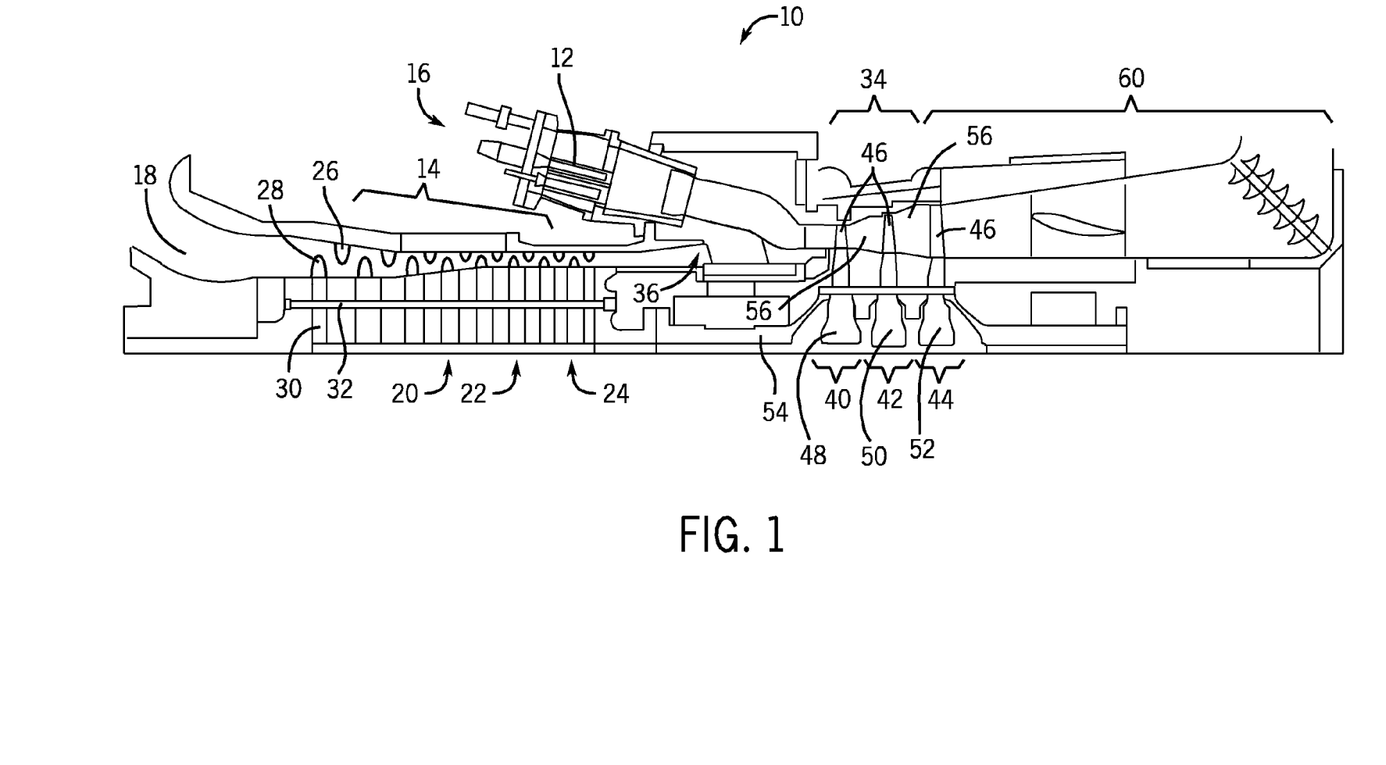
FIG. 1 depicts a cross-sectional view of an embodiment of a turbine system that may employ wide gap brazing.

With the foregoing in mind and turning now to FIG. 1, it may be beneficial to discuss certain turbomachinery components that may be brazed by using the embodiments disclosed herein. For example, certain components of the turbine system 10 depicted in FIG. 1, may require repair or joining. Mechanical systems, such as the turbine system 10, experience mechanical and thermal stresses during operating conditions, which may require periodic repair of certain components. During operations of the turbine system 10, a fuel such as natural gas or syngas, may be routed to the turbine system 10 through one or more fuel nozzles 12 into a combustor 16. Air may enter the turbine system 10 through an air intake section 18 and may be compressed by a compressor 14. The compressor 14 may include a series of stages 20, 22, and 24 that compress the air. Each stage may include one or more sets of stationary vanes 26 and blades 28 that rotate to progressively increase the pressure to provide compressed air. The blades 28 may be attached to rotating wheels 30 connected to a shaft 32. The compressed discharge air from the compressor 14 may exit the compressor 14 through a diffuser section 36 and may be directed into the combustor 16 to mix with the fuel. For example, the fuel nozzles 12 may inject a fuel-air mixture into the combustor 16 in a suitable ratio for optimal combustion, emissions, fuel consumption, and power output. In certain embodiments, the turbine system 10 may include multiple combustors 16 disposed in an annular arrangement. Each combustor 16 may direct hot combustion gases into a turbine 34.

As depicted, the turbine 34 includes three separate stages 40, 42, and 44 surrounded by a casing 56. Each stage 40, 42, and 44 includes a set of blades or buckets 46 coupled to a respective rotor wheel 48, 50, and 52, which are attached to a shaft 54. As the hot combustion gases cause rotation of turbine blades 46, the shaft 54 rotates to drive the compressor 14 and any other suitable load, such as an electrical generator. Eventually, the turbine system 10 diffuses and exhausts the combustion gases through an exhaust section 60. Turbine components, such as the nozzles 12, intake 18, compressor 14, vanes 26, blades 28, wheels 30, shaft 32, diffuser 36, stages 40, 42, and 44, blades 46, shaft 54, casing 56, and exhaust 60, may use the disclosed embodiments to repair any cracks or wide gaps, as described in more detail with respect to FIG. 2 below.

Figure 2:
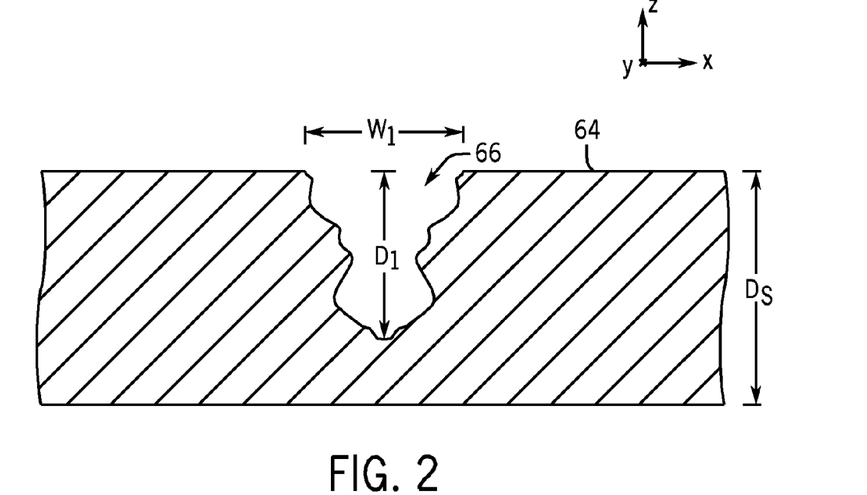
FIG. 2 depicts a cross-sectional view of an embodiment of a gap in a substrate.

FIG. 2. is a cross-sectional view illustrating an embodiment of a substrate 64 having a substrate depth of $D_s$ millimeters. The substrate 64 may have a material composition that includes any number of metals, metal alloys, and/or metalized ceramics. For example, if the metal substrate 64 is part of the casing 56, the metal substrate 64 may be a cast iron substrate 64 or any other suitable casing substrate 64. Indeed, the substrate 64 may be part of any number of mechanical components, such as the components of the turbine system 10 described above with respect to FIG. 1. The substrate 64 may have been exposed to prolonged use or overuse, resulting in a wide gap 66. In the depicted embodiment, the gap 66 is approximately $W_1$ millimeters long and $D_1$ millimeters deep. $W_1$ and $D_1$ may be of a size that renders other repair techniques, such as arc welding or standard brazing, unsuitable for use. For example, $W_1$ and $D_1$ may be approximately greater than 3 mm. In certain cases, $D_1$ is approximately equal to $D_s$. That is, the gap 66 may have resulted in a separation of the substrate 64 into two pieces. Traditional welding and brazing techniques cannot always be used to successfully repair damage in cavities such as gap 66, and it is thus desirable to use the wide gap embodiments described herein for successful component restoration. Indeed, the disclosed brazing and braze welding embodiments allow for a repair of the gap 66 even in circumstances where the substrate 64 may have split into two (or more) pieces, as further described in FIG. 3

Figure 3:
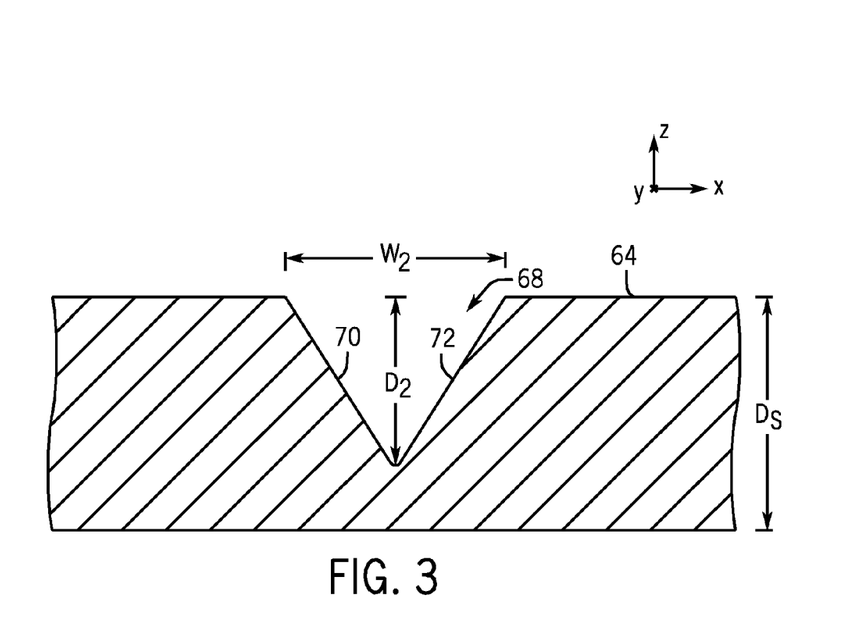
FIG. 3 depicts a cross-sectional view of an embodiment of a machined gap in a substrate.

FIG. 3 is a cross-section view illustrating an embodiment of a gap 68. The gap 68 is formed by applying a certain treatment to the gap 66 of FIG. 2. More specifically, the gap 68 is the result of machining and/or cleaning of the gap 66. In the illustrated embodiment, edges 70 and 72 have been machined by using, for example, an angle grinder, resulting in the gap 68 having substantially uniform walls more suitable for the application of a GFC. The machining of the edges 70 and 72 may also remove any corrosion, oxidation, and other contaminants that may have been found inside of the gap 66 of FIG. 2. The gap 68 includes a width $W_2$ and a depth $D_2$ greater than width $W_1$ and depth $D_2$ of the gap 66. The larger width $W_2$ and depth $D_2$ may result from machining the edges 70 and 72 into more uniform edges, and from removing any undesirable particulate. In certain embodiments, the gap 68 may be further cleaned by the application of a cleaning solution such as a slightly acidic solution, followed by the application of another cleaning solution designed to stop any acidic reaction. It is to be understood that any other suitable chemical treatments or cleaning solutions may be used. This chemical treatment may further eliminate unwanted particulate or contaminants from the gap 68. It is to be noted that other cleaning operations may be used, for example, a wire brush or a sandblasting may be used to remove particulate matter prior to the chemical treatment. An GFC may then be applied to the gap 68, as described in more detail below with respect to FIG. 4

Figure 4:
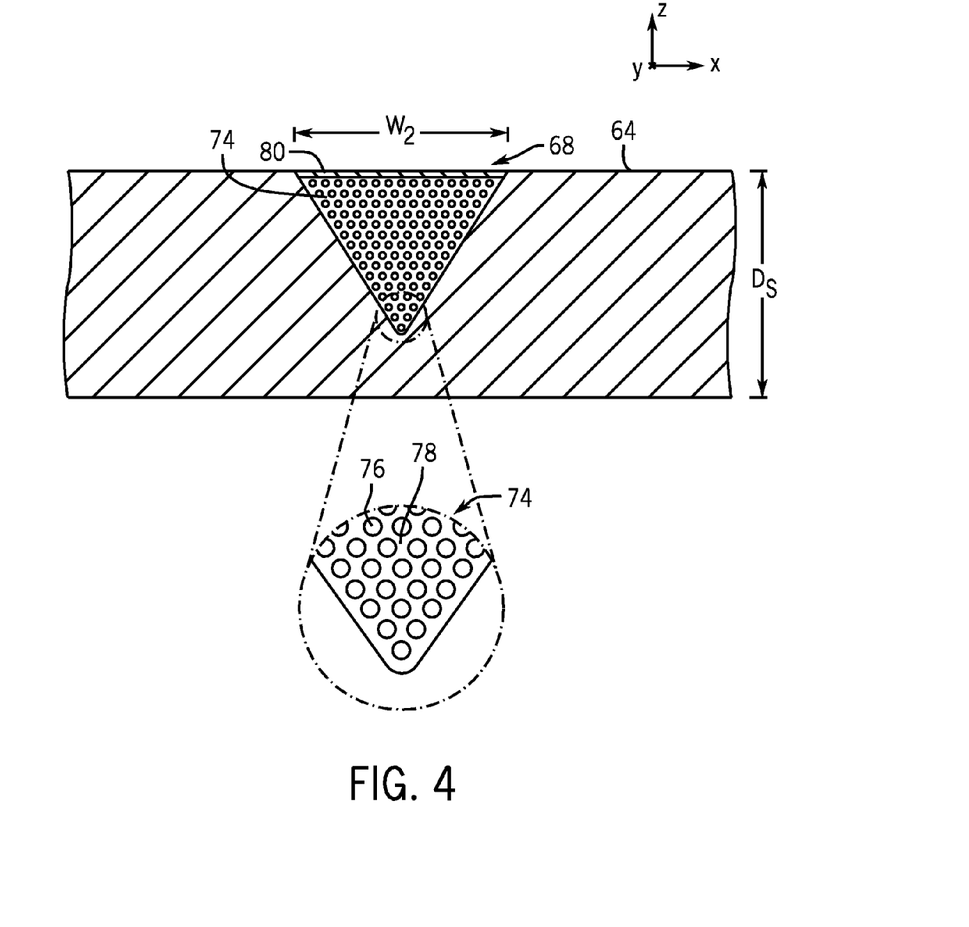
FIG. 4 depicts a cross-sectional view of an embodiment of gap filling compound disposed inside a gap in a substrate.

FIG. 4 illustrates the application of a GFC 74 inside of the gap 68. In certain embodiments, the GFC 74 may be of a consistency similar to a putty, a modeling clay, or a slurry paste. Accordingly, the GFC 74 may be capable of a plastic flow similar to putty that enables a hand placement of the GFC 74 inside of the gap 68. Indeed, a field repair technician may hand place the GFC 74 in field locations without the need to move the substrate 64 to a specific repair locations such as a service shop. Accordingly the field repair technician may carry a repair kit that includes the GFC 74 as well as a mesh, perforated metal sheet, and/or ceramic filter, as described in more detail below with respect to FIG. 5.

The GFC 74 composition may include filler metal beads 76 or filler particulate. Additionally, the remainder portions of the GFC 74 may include a "grade" or material composition different than the filler metal 76. Further, the filler metal 76 may include filler metal at different "grades". "Grades" refer to a system for classifying filler metal according to its mechanical and/or chemical properties (e.g., impact strength at a given temperature). Accordingly, as the filler metal 76 melts, a capillary-dominated space may be used to "pull" in the filler metal through a capillary force. The capillary action is beneficial in enabling the molten metal to flow more uniformly through the interstices in the gap 68. The GFC 74 may be treated, for example, by tumble mixing with the filler metal 76, so as to enhance a bonding between the GFC 74 and the filler metal 76.

The filler metal beads 76 may include a material composition having any number of metals, and/or metal alloys. In one example, the material composition for the filler metal beads 76 may be chosen based on the material composition of the substrate 64 and/or the expected service use of the component having the substrate 64. Additionally, the filler metal beads 76 may be chosen based on their ability to "wet" the substrate, melt at a lower temperature than the substrate, or melt at a specific temperature. "Wetting" relates to the ability of the filler metal beads 76, when molten, to flow over and adhere to the substrate 64. Some example material composition for the filler metal beads 76 include copper, zinc, aluminum, silver, nickel, iron, chromium, silicon, and/or boron. The filler metal beads 76 may have a diameter of approximately 0.1 mm to 3 mm., 0.5 mm to 1.05 mm., 0.1 mm to 5 cm., or any other suitable diameter. It is to be noted that, in other embodiments, the filler metal may be shaped differently, such as a wire, as a cube, and/or in shapes having irregular geometries or curves. Additionally, the filler metal may be a paste, a powder, a wire, and so forth. Indeed, certain embodiments may combine the filler metal beads 76 with filler metal having other shapes.

The filler metal beads 76 may be gas atomized beads 76. That is, high-velocity jets of gas, such as nitrogen, argon, or helium gas, may be used to disperse molten liquid filler metal so as to create metal filler beads 76 once the liquid has solidified. Such treatment may reduce the oxygen content of the filler metal beads 76, aiding in the prevention of oxidation and increasing wetting abilities during the brazing operation. In other embodiments, the filler metal beads 76 may be oil atomized beads 76. The oil atomization process may use oil jets to disintegrate the molten filler metal, also resulting in the filler metal beads 76 having a lower oxygen content.

In the depicted embodiment, the filler metal may be mixed with a flux, such as a powder flux 78. The powder flux 78 may be any commercially available flux suitable for protecting the substrate and filler metal from oxidation. The powder flux 78 may be selected also based on the brazing temperature to be used, the material composition of the substrate 64, the material composition of the filler metal beads 76, and/or the amount of brazing time that may be desired. In other embodiments, the flux 78 may be a paste flux or a liquid flux. Additionally, a liquid flux 80 may be applied on top of the GFC 74 and gap 68. The application of the flux 80 is useful in field environments, such as open air environments, that include oxygen in the atmosphere. In these environments, the flux 80 may enable a sealing of the gap 68, thus protecting the sealed gap 68 from an overexposure to oxygen. The liquid flux 80 may be sprayed, coated, or applied in any suitable manner so as to sealingly cover the top of the gap 68.

In other brazing processes, such as when using a brazing furnace, the liquid flux 80 may optionally not be used. Indeed, the disclosed embodiments may be used in a furnace brazing process in addition to a field brazing process. In furnace brazing, the brazing furnace may provide for an atmosphere suitably configured to substantially prevent oxidation. For example, the atmosphere may be an inert, reducing, or vacuum atmosphere. A screen may then be placed on top of the liquid flux 80, GFC 74, and gap 68, as described in more detail below with respect to FIG. 5.

Figure 5:
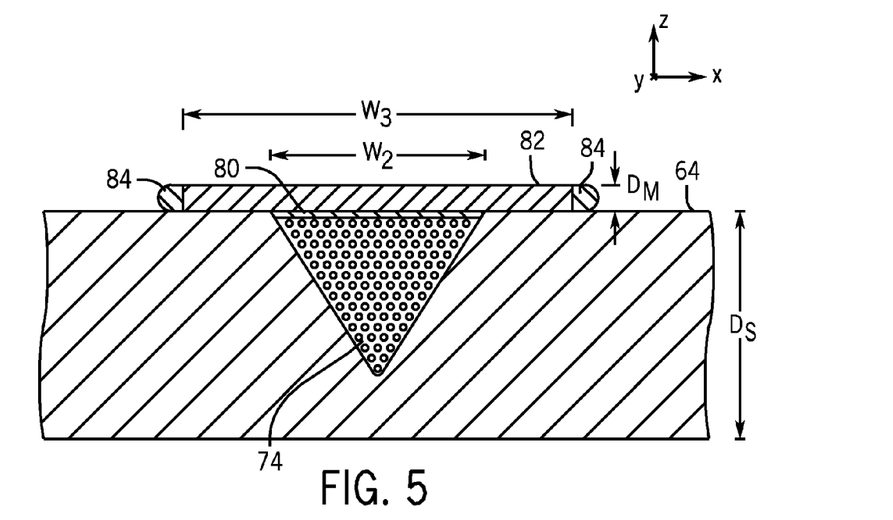
FIG. 5 depicts a cross-sectional view of an embodiment of screen disposed on top of a gap filling compound inside a gap in a substrate.

FIG. 5 is a cross-section view illustrating an embodiment of a screen 82 (i.e., GFC retention screen) disposed on top of the liquid flux 80, the GFC 74, and the gap 68. Without the use of the screen 82, some brazing activities such as outgassing, thermal activities, and chemical activities may tend to expel the GFC 74 outwardly from the substrate 64. Indeed, the outwardly movement of the GFC 74 may leave undesirable interstices or voids, impeding a capillary action. The capillary action is beneficial in enabling the molten GFC 74 to flow more uniformly throughout the gap 68, thus resulting in a stronger repair once the GFC 74 cools below its solidus temperature (i.e., temperature at which the materials enter a solid phase). Accordingly, the screen 82 includes properties suitable for constraining the GFC 74 inside of the gap 68, while allowing for outgassing during brazing operations. Indeed, the screen 82 may be capable of withstanding brazing temperatures without melting or otherwise undergoing substantial distortions in its geometry.

In one embodiment, the screen 82 may be a mesh, as described in more detail below with respect to FIG. 6. In another embodiment, the screen 82 may be a perforated sheet metal. In these embodiments, the screen 82 may be manually shaped so as to follow the contour of the substrate 64. For example, if the substrate 64 includes curved surfaces, then the screen 82 can be manually shaped or "bent" so as to follow any curves disposed on the surfaces of the substrate 64. Accordingly, the screen 82 may include a depth $D_M$ suitable for enabling the manual shaping or bending of the screen 82. For example, the depth $D_M$ may be approximately smaller than 15 mm. It is to be noted that other less manually shapeable embodiments may include a depth $D_M$ larger than 15 mm. Further, the screen 82 may include a width $W_3$ larger than the width $W_2$ of the gap 68 in order to completely cover the gap 68. For example, $W_3$ may be approximately 1%, 5%, 10%, 15% larger than $W_2$.

In certain embodiments, the screen 82 may be a ceramic screen. In one embodiment, the ceramic screen includes a porosity suitable for enabling the outgassing of brazing gases or vapors, while containing the GFC 74 inside of the gap 68. In another embodiment, the ceramic screen may have holes mechanically drilled or manufactured that enable the outgassing of the brazing gases. In this way, a ceramic can be suitably used to contain the GFC 74. The use of ceramic screens 82 can facilitate the use of higher brazing temperatures, because the ceramic may be able to withstand temperatures in excess of approximately 3300° C.

In embodiments where the screen 82 is a mesh or a perforated sheet metal, the screen 82 can be welded onto the substrate 64. As illustrated, "tack" welds 84 may be used to selectively weld certain portions of the screen 82, such as the corners of the screen 82, to the substrate 64. In other embodiments, the screen 82 may be fastened to the substrate 64 through magnetism. For example magnets may be attached to both the screen 82 and the substrate 64, or the screen 82 may be a magnetic screen 82.

Figure 6:
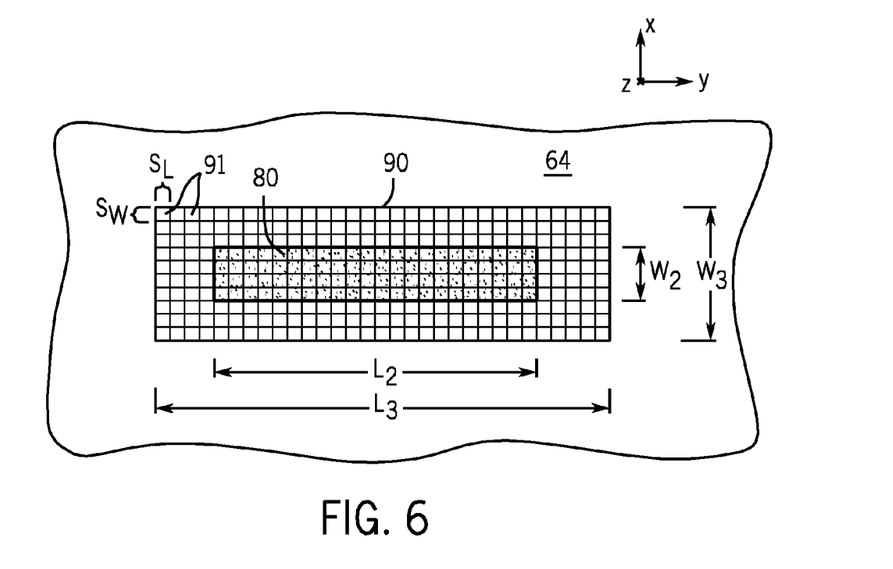
FIG. 6 depicts a top view of an embodiment of screen disposed on top of a gap filling compound inside a gap in a substrate.

FIG. 6 is a top view illustrating an embodiment of a mesh 90 disposed on top of the gap 68 and the fluid flux 80. The depicted embodiment more clearly shows coverage of the gap 68 by a screen 82, such as the mesh 90. Indeed, the mesh 90 (or screen 82) may completely cover the surface of the gap 68, so as to prevent the GFC 74 from flowing outside the edges of the gap 68. In the depicted embodiment, the mesh 90 includes a length $L_3$ greater than a length $L_2$ of the gap 68. Further, the mesh's width $W_3$ is also greater than the width $W_2$ of the gap 68. For example, $L_3$ may be approximately 1%, 5%, 10%, 15% larger than $L_2$. Likewise, $W_3$ may be may be approximately 1%, 5%, 10%, 15% larger than $W_2$. In other embodiments, the mesh 90 may include a size approximately equal to the size of the gap 68, and accordingly, $L_2$ may approximately equal $L_3$, and $W_2$ may approximately equal $W_3$.

The mesh 90 may also include multiple openings 91 having a mesh or screen length $S_L$, and a mesh or screen width $S_W$. In the depicted embodiment, $S_W$ and $S_L$ are approximately the same size, thus resulting in a square opening 91. It is to be understood that, in other embodiments, $S_W$ and $S_L$ may be sized differently or the openings 91 of the mesh may have other geometries such as circular openings, triangular, openings, irregular openings, and so forth. As brazing gasses form in the gap 68, the gases may outgas through the openings in the mesh. Accordingly, $S_W$ and $S_L$ may be approximately between 0.01 mm and 0.1 mm., 0.05 mm and 1.5 mm., 0.01 mm and 5 cm. Indeed, a wide variety of sizes may be used suitable for enabling outgassing during brazing activities, but substantially containing the GFC 74 inside of the gap 68. Accordingly, a stronger, more durable, and more reliable repair or joint may be realized by containing the GFC 74 inside of the gap 68.

Figure 7:
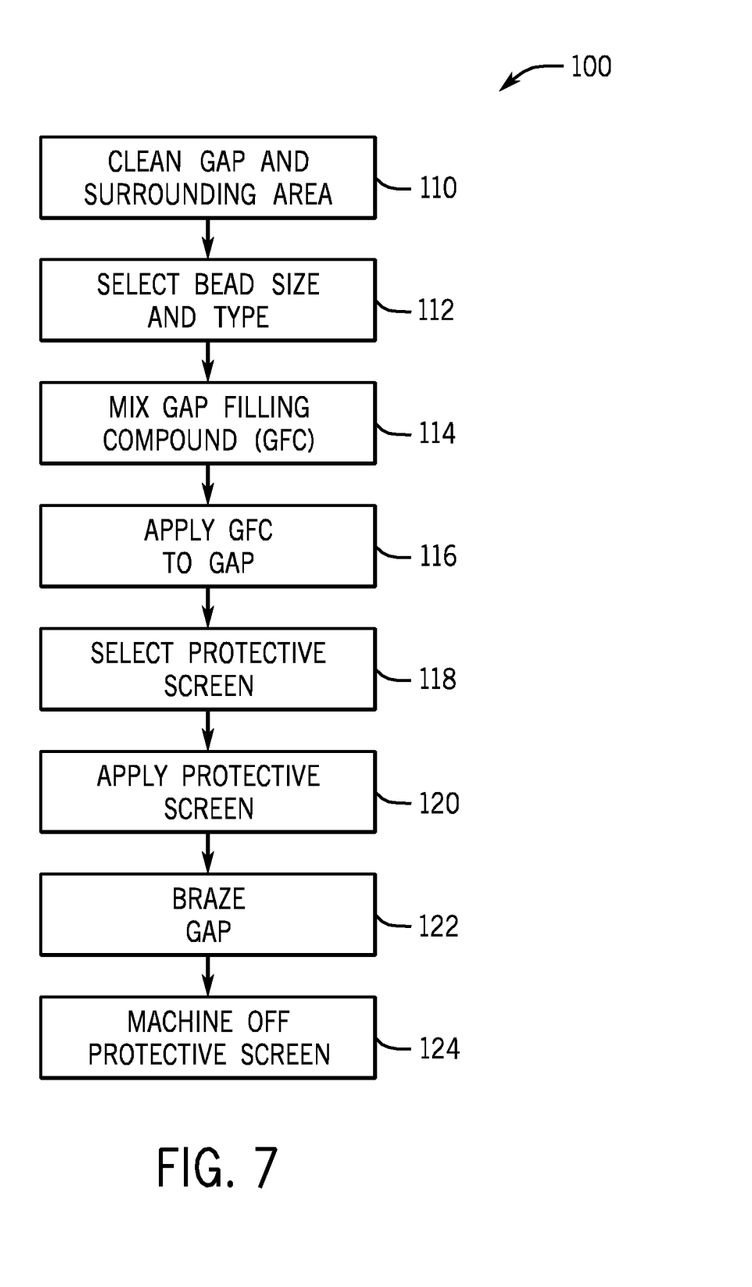
FIG. 7 illustrates an embodiment of a method for brazing a gap.

FIG. 7 illustrates an embodiment of a logic 100 suitable for brazing a wide gap, such as the gap described above with respect to FIGS. 2-6. The gap 66 and surrounding area may first be cleaned (block 110). For example, the gap 66 may be machined by applying an angle grinder or any other suitable tool, so as to remove any corrosion, oxidation, and other unwanted material, resulting in a clean gap 68. The area surrounding the gap may also be similarly cleaned. A metal filler bead size and type (e.g., material composition) may then be selected (block 112). The selection of the size and type of the metal filler beads 76 (or filler metal wire, paste, and/or powder) may depend on the shape and dimensions of the gap 68, the intended service use of the repair, and/or the type of substrate 64 underlying the gap 68. For example, the filler metal 76 may be selected to have a lower melting point than the melting point of the underlying substrate 64, but high enough to withstand regular use. Likewise, smaller bead sizes may melt faster than larger bead sizes, so a brazing time may also be taken into account. The type of brazing technique (e.g., field brazing, furnace brazing) may also be used to select the size and type of the filler metal beads (block 112).

Once the size and type of filler metal beads 76 have been selected, the gap filling compound (GFC) 74 may be mixed (block 114). In certain embodiments, the mix may include powdered flux 78, liquid flux, flux paste, or any other suitable brazing mixture (e.g., plasticizer). For example, the plasticizer may be included in the mixture so as to provide added softness, adhesion, and flexibility to the mixture. Indeed, the mixture may be prepared so as to result in a GFC paste, slurry, or clay. The GFC 74 may then be applied to the gap (block 116). In certain embodiments, the GFC 74 may be mixed in the field. After mixing, a field technician may manually press or otherwise "spread" the GFC 74 inside of the gap so as to substantially cover the gap 68.

A screen 82 may then be selected (block 118) suitable for use with the GFC 74 and the gap 68. The selection of the screen 82 may depend on the gap geometry, the brazing temperatures to be used, the GFC composition (e.g., size and type of metal filler beads), and the geometry of the substrate (e.g., planar, non-planar). For example, a stainless steel mesh may be selected suitable to work with most brazing temperatures approximately between 250° C. to 1300° C. The screen 82 may also be selected with openings suitable for containment of the GFC 68 during outgassing. For example, the openings may be square openings of a width and length approximately between 0.01 mm and 0.1 mm., 0.05 mm and 1.5 mm., 0.01 mm and 5 cm. The screen 82 may then be applied so as to cover the gap (block 120). In one embodiment, the screen 82 may be "tack" welded onto the substrate. In another embodiment, the screen 82 may be magnetically fastened onto the substrate 64, for example, by using a magnetic screen or by using individual magnets. In yet another embodiment, the weight of the screen 82 may be sufficient to secure the screen 82 during brazing. Once the screen 82 is suitable attached, the gap 68 may be brazed (block 122).

Brazing of the gap (block 122) may include several techniques. In one example, a localized heat source such as an oxy-fuel torch may be used to apply heat to the gap and/or the substrate. Indeed, a field brazing of wide gaps may now be possible by using the disclosed embodiments. In field brazing, the oxy-fuel torch, or any other suitable localized heat source, may apply a direct flame to the brazing area (e.g., gap 68 and/or substrate 64). Any number of fuels may be used, including acetylene, gasoline, butane, propane, propylene, MAPP gas, and so forth. Field brazing allows for brazing of parts that are too costly or time consuming to move. For example, the turbine casing 56 may weight over 500 kg. and may require special tools and/or techniques to remove and transport into the service shop. Accordingly, the techniques disclosed herein facilitate a field technician to use, for example, a repair kit including the GFC mix components and a screen. The GFC 74 may be mixed in the field, applied to the gap 68, and a screen 82 then used to cover the gap 68. The gap 68 may then be torch brazed, resulting in a suitable repair. In another example, a furnace brazing may be used. In furnace brazing, the brazed part is disposed inside of a braze furnace and a controlled heat cycle may be used. The controlled heat cycle may allow for the use of more precise brazing temperatures as compared to field brazing.

During brazing, the GFC 74 is heated slightly above melting temperatures of the filler metal 76, causing the filler metal 76 to melt while suitably protected from certain atmospheric conditions by the flux 78 and 80. As the filler metal 76 melts, a capillary action may enable the filler metal 76 to flow onto the surfaces of the gap 68. Indeed, the capillary action may, in certain circumstances, be able to "pull" the molten filler metal 76 against gravity. Accordingly the molten filler metal may be able to flow through or "wet" the surfaces of the gap 68. Certain gases or vapors may result during the brazing process. These gases may build pressures capable of expelling some of the GFC 74 and/or filler metal 76 outwardly from the gap 68. However, with the screen 82 in place, the gases may exit through the screen 82 while a substantial portion of the GFC 74 and filler metal 76 remains in the gap. The filler metal 76 is thus able to flow more uniformly in the gap 68. As the brazing temperature is reduced, the filler metal 76 fuses with the substrate 64, forming a repair substantially devoid of any cracks, tears, blisters, voids, and the like. Indeed, the disclosed embodiments may result in a higher strength, more secure, and longer lasting repair or joint.

Once the gap 68 is brazed (block 122) and the repair is allowed to cool, the screen 82 may be machined off (block 124). For example, a grinder may be used to grind off the screen 82 portion of the repair. It is to be understood that, in other embodiments, the screen 82 may be left on the repaired part. For example, the screen 82 may not interfere with any other component or operations of the repaired part. Accordingly, it may be more efficient and economic to allow the screen to remain in place.

Technical effects of the invention include the field brazing of machine components such as casings, wheels, blades or buckets, inlets, nozzles, and the like. Further technical effects include improved retention of wide gap filling compounds during brazing outgassing. A field repair kit may be used to suitably repair wide gaps in a variety of machine components that a difficult to disassemble and move to a service shop.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system comprising:
   a substrate;
   a gap filling compound (GFC) comprising a brazing alloy having a plurality of particles, wherein the GFC is disposed inside a gap of the substrate; and
   a GFC retention screen having a plurality of openings sized smaller than a size of the particles and disposed over the GFC and the substrate, the plurality of openings sized to substantially retain the GFC within the gap during brazing, and the GFC retention screen is configured to enable gas to escape from the GFC during brazing and to substantially block a flow of the GFC.

2. The system of claim 1, wherein the plurality of particles comprise a plurality of filler metal beads.

3. The system of claim 2, wherein the GFC retention screen comprises a metal screen having a plurality of openings, and each opening has a diameter approximately between 0.01 millimeters and 3 centimeters.

4. The system of claim 3, wherein the GFC retention screen comprises a flat mesh or a perforated sheet metal that follows a contour of a part.

5. The system of claim 1, wherein the GFC retention screen comprises a ceramic screen.

6. The system of claim 1, comprising a turbine component having the substrate, wherein the substrate comprises iron, steel, nickel, cobalt, manganese, tungsten, titanium, an aluminum or a combination thereof.

7. The system of claim 1, wherein the GFC retention screen is configured to overlap the substrate adjacent the gap, and the GFC retention screen is configured to be secured to the substrate prior to the brazing.

8. The system of claim 1, wherein the GFC retention screen is configured to cover the gap having a width or length of at least 3 millimeters.

9. The system of 1, wherein the GFC retention screen is sized at least approximately 5% wider than the width of the gap.

10. A system comprising:
    a gap filling compound (GFC) comprising a brazing alloy having a plurality of particles, wherein the GFC is configured to be disposed inside a gap of a substrate; and
    a GFC retention screen having a plurality of openings sized smaller than a size of the particles and configured to be disposed over the GFC to retain the GFC within the gap during brazing, and the GFC retention screen is configured to enable gas to escape from the GFC during brazing and to substantially block a flow of the GFC.

11. The system of claim 10, comprising a substrate, wherein the retention screen is disposed on top of the substrate.

12. The system of claim 11, wherein the substrate comprises a turbine component.

13. The system of claim 10, wherein the retention screen comprises a magnetized retention screen having a magnetic force suitable for magnetically securing the magnetic retention screen to the substrate.

* * * * *